United States Patent [19]

Sudo

[11] Patent Number: 5,856,827
[45] Date of Patent: Jan. 5, 1999

[54] PORTABLE TELEVISION WITH RECOGNIZABLY DIFFERENT LOW/HIGH HIERARCHY DISPLAYS

[75] Inventor: Fukuharu Sudo, Tokyo, Japan

[73] Assignee: Sony Corporation, Tokyo, Japan

[21] Appl. No.: 805,364

[22] Filed: Feb. 24, 1997

[30] Foreign Application Priority Data

Feb. 26, 1996 [JP] Japan .................................. 8-065377

[51] Int. Cl.⁶ .................................................. G06F 15/00
[52] U.S. Cl. ........................ 345/352; 345/157; 345/184; 345/348; 345/352
[58] Field of Search ..................................... 345/348, 352, 345/353, 157, 184

[56] References Cited

U.S. PATENT DOCUMENTS 5,491,784  2/1996  Dougles et al. ......................... 345/352
5,692,145  11/1997  Nakanishi ............................... 345/348

*Primary Examiner*—Huynh Ba
*Attorney, Agent, or Firm*—Jay H. Maioli

[57] ABSTRACT

A portable communication apparatus provides a display on which the user is able to easily find out the object item at the time of displaying a list of the plural items. In the case where the functional items are separated into some groups and formed into hierarchical structure, the display layout is changed for each hierarchy at the time of displaying the list of the items. Therefore, by viewing the differences among the display layouts, the user can know which hierarchy is currently being displayed and can easily find out the object item.

11 Claims, 17 Drawing Sheets

GROUP IS DECIDED BY CLICKING

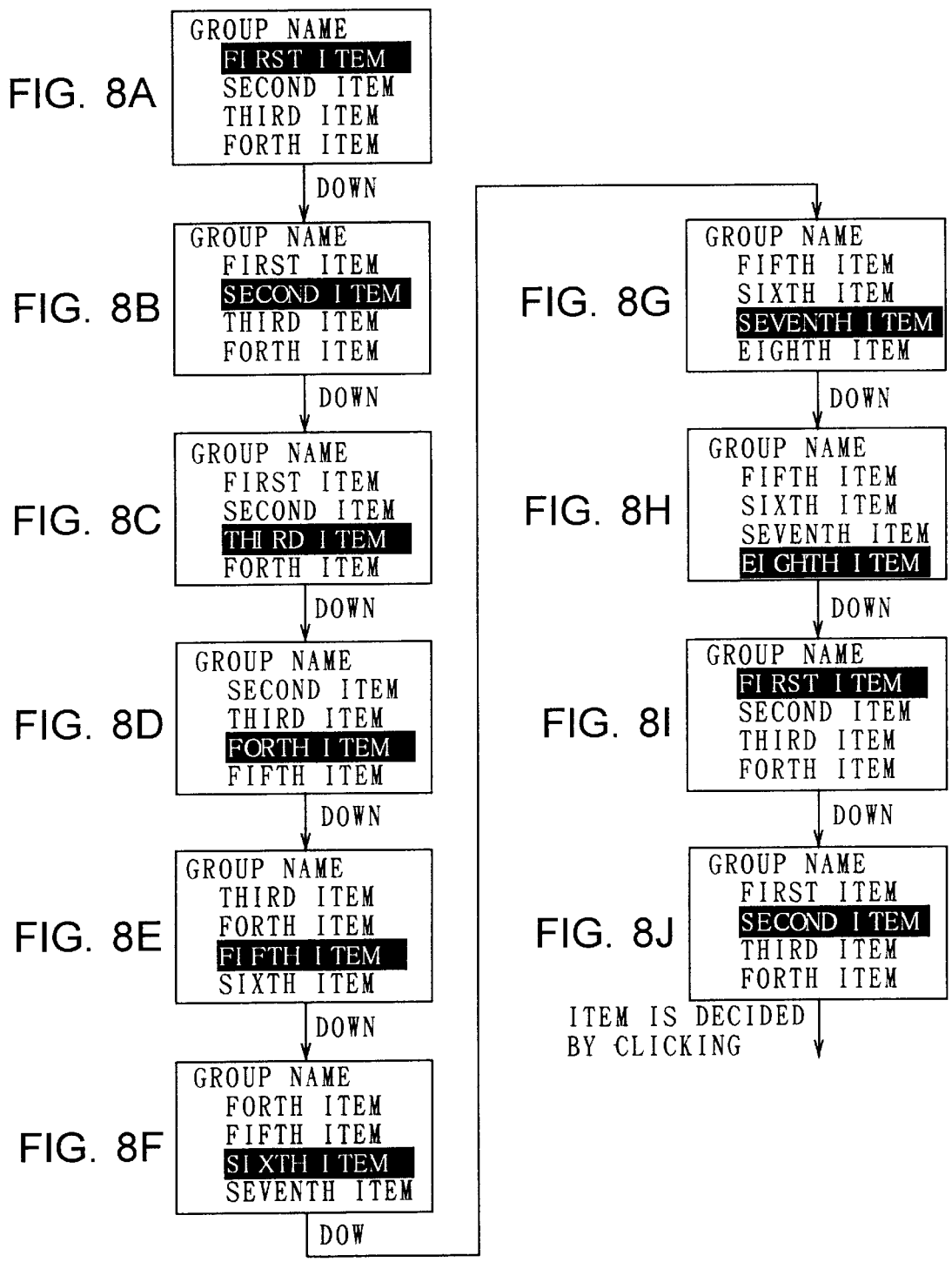

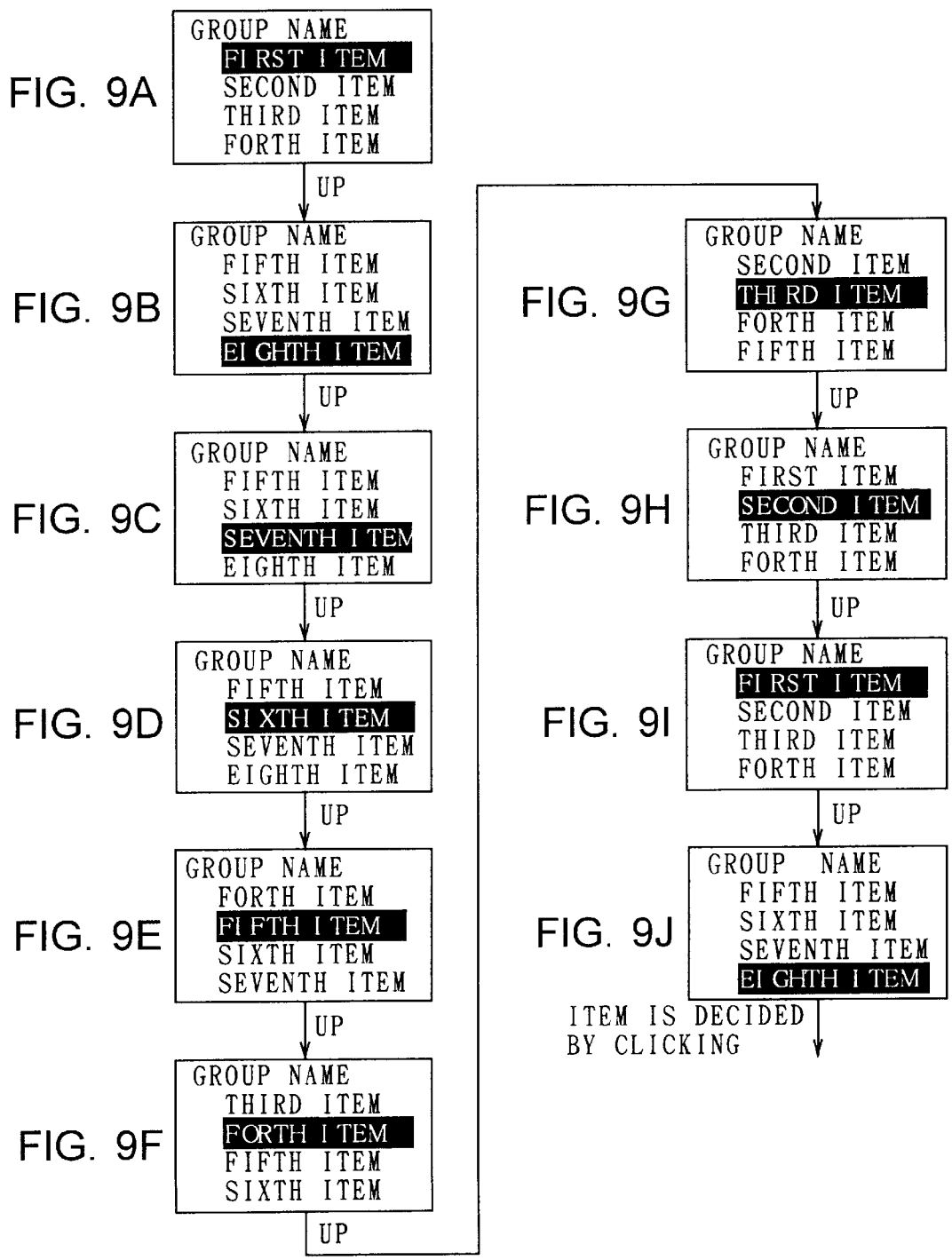

```
GROUP 1     ITEM 1 OF GROUP 1 ↑
            ITEM 2 OF GROUP 1 |
            ITEM 3 OF GROUP 1 |   SIX ITEMS BELONGING
            ITEM 4 OF GROUP 1 |   TO GROUP 1
            ITEM 5 OF GROUP 1 |
            ITEM 6 OF GROUP 1 ↓
GROUP 2     ITEM 1 OF GROUP 2 ↑
            ITEM 2 OF GROUP 2 |
            ITEM 3 OF GROUP 2 |
            ITEM 4 OF GROUP 2 |   SEVEN ITEMS BELONGING
            ITEM 5 OF GROUP 2 |   TO GROUP 2
            ITEM 6 OF GROUP 2 |
            ITEM 7 OF GROUP 2 ↓
GROUP 3     ITEM 1 OF GROUP 3 ↑
            ITEM 2 OF GROUP 3 |   THREE ITEMS BELONGING
            ITEM 3 OF GROUP 3 ↓   TO GROUP 3
```

FIG. 11

```
| NAME OF GROUP 3   ITEM 1 OF GROUP 3 |
|                   ITEM 2 OF GROUP 3 |
|                   ITEM 3 OF GROUP 3 |
```

FIG. 18

↓ DOWN

↓ DOWN

↓ DOWN

↓ DOWN

↓ DOWN

↓ DOWN

↓ DOWN (A)

FIG. 15H
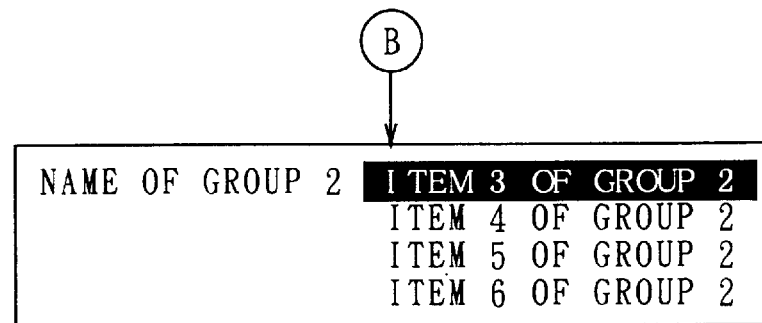
FIG. 15I
FIG. 15J
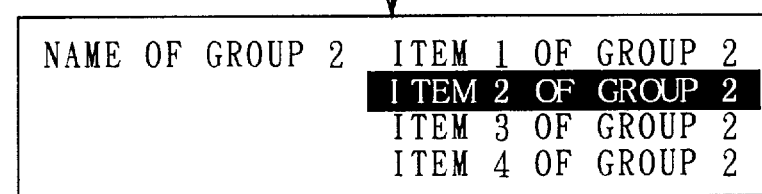
FIG. 15K
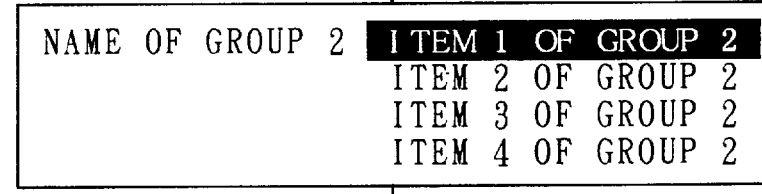
FIG. 15L
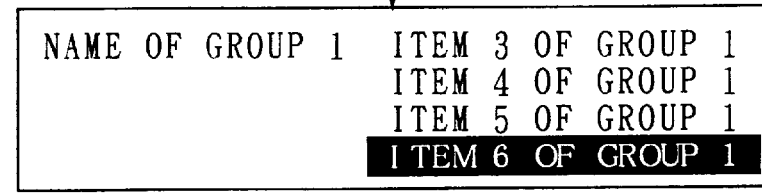

ITEM IS DECIDED BY CLICKING

PORTABLE TELEVISION WITH RECOGNIZABLY DIFFERENT LOW/HIGH HIERARCHY DISPLAYS

BACKGROUND OF THE INVENTION

1. Field of the Invention

This invention relates to a portable communication apparatus, and more particularly, is suitably applied to a portable telephone apparatus which displays a list of plural items registered in a menu.

2. Description of the Related Art

In recent years, the diffusion of portable telephone apparatuses is remarkable, and, in proportion to it, a great variety of functions are added to the portable telephone apparatuses. There are various kinds of such functions, as follows. Telephone directory function for registering the telephone number for each name, short-message transmission function for transmitting a short telegraphic message, transfer function for transferring a call-in toward another terminal, and call out/in limit function for limiting call-out and call-in, etc.

Usually, these functions are registered in a menu. The menu is read and a desired item is selected in turn, so that an arbitrary setting can be obtained in accordance with a user's desire.

By the way, since the functional items to be displayed have increased and the number of the rows and the number of the columns of the liquid crystal display which has been provided as a display means are not sufficient, the items are separated into groups which are respectively comprised of the related items, and the menu which is provided in the portable telephone apparatus is hierarchically constructed, in general. So, when the stated functional item is to be set, the group to which the functional item belongs is first selected, and then the list of the items which belong to the group is displayed. Thereafter, the desired functional item is found during scrolling the list of the items, and the cursor is adjusted to that portion to select the functional item, and the setting is performed.

However, in the conventional menu displaying, ways of displaying are the same with respect to a display of a group of high hierarchy and a display of functional items of low hierarchy. For this reason, there is such inconvenience that the hierarchy becomes unclear to the user and so the desired functional item can not be found, at the time of searching of the desired functional item. This problem occurs more often as the number of hierarchies is increased and the structure is complicated, and it is considered that the problem occurs still more often when the number of the functional items is hereafter increased in accordance with increasing the functions.

SUMMARY OF THE INVENTION

In view of the foregoing, an object of this invention is to provide a portable communication apparatus which provides a display on which a user can easily find an object item, at the time of displaying a list of plural items.

The foregoing object and other objects of the invention have been achieved by the provision of a portable communication apparatus in which, in the case where the plural items have been separated into groups and formed into hierarchical structure, a display layout is changed for each hierarchy at the time of displaying the list of the items. Thereby, the user can know which hierarchy's items are currently being displayed by viewing the difference among the display layouts, and therefore can easily find the desired object item.

Besides, in the present invention, in the case of displaying the list of the plural items, the plural items are separated into groups, and the group name to which the displayed items belong is displayed on the display means. In this way, the user become capable of easily finding out the object item, taking the group name as a guide.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 7A to 7K, 8A to 8J, and 9A to 9J are schematic diagrams explaining the menu displaying according to the first embodiment;

FIG. 11 is a schematic diagram explaining the menu structure according to the second embodiment;

FIGS. 12A to 12G, 13H to 13N, 14A to 14G, and 15H to 15L are schematic diagrams explaining the menu displaying according to the second embodiment;

FIG. 18 is a schematic diagram explaining the case where the broken line for indicating the boundary of the group has been displayed.

DETAILED DESCRIPTION OF THE EMBODIMENT

Figure 1:
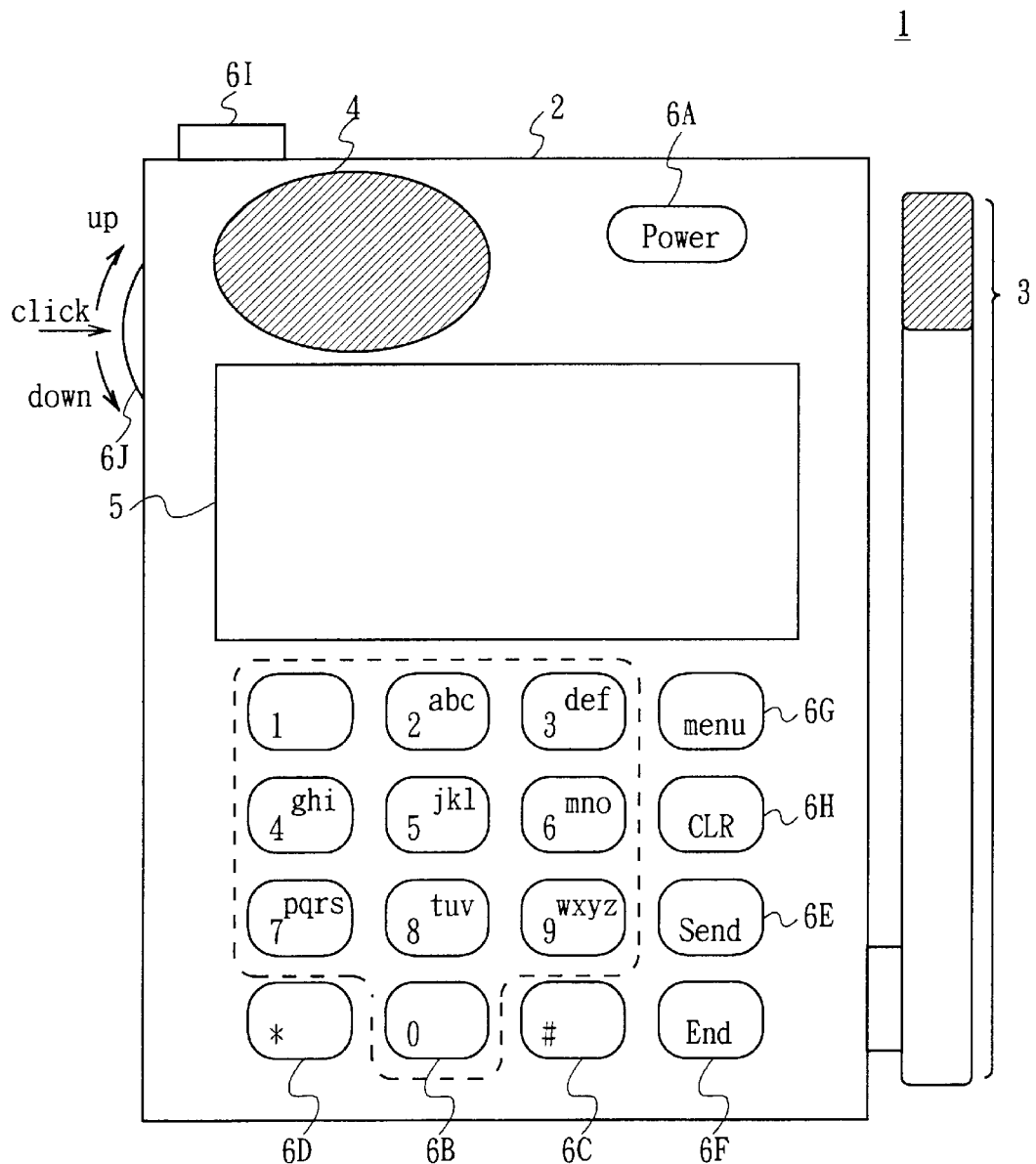
FIG. 1 is a schematic diagram showing the general constitution of a portable telephone apparatus according to one embodiment of the present invention.
Figure 2:
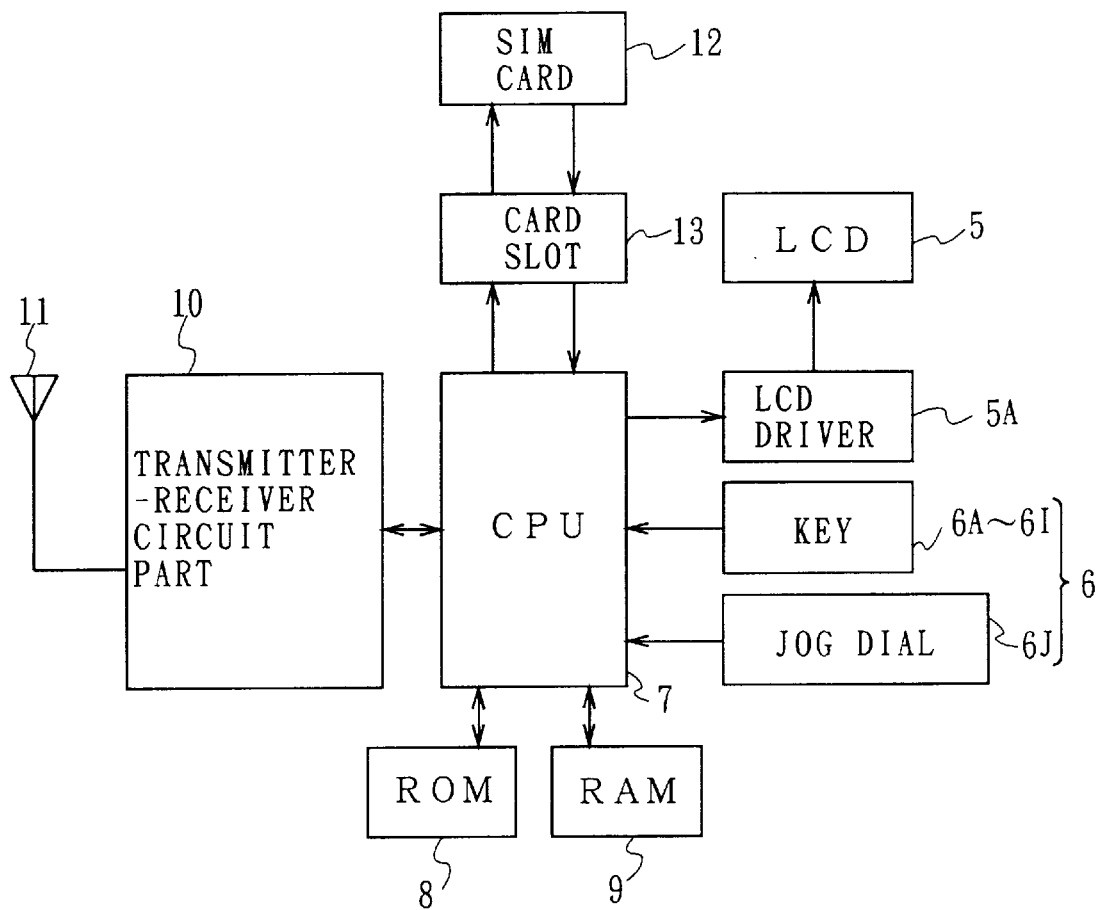
FIG. 2 is a block diagram showing a constitution of the circuit which is provided within the portable telephone apparatus.

Preferred embodiments of this invention will be described with reference to the accompanying drawings:

At first, the overall configuration and the circuit configuration of a portable telephone apparatus 1 will be explained with reference to FIGS. 1 and 2. The portable telephone apparatus 1 is roughly composed of a main body 2 of the apparatus and an arm microphone 3 which is attached to the side of the main body so as to be freely rotated (opened and closed). Therefore, while the apparatus is not in use, the size of the portable telephone apparatus 1 can be further reduced by closing the arm microphone 3.

The arm microphone 3 has a function for negating the operation of keys other than the specific key in a closed state (hereinafter, referred to as a key-lock function), in addition to a function for controlling on-hook or off-hook in response to an opening or closing operation. In this connection, the key-lock condition can be canceled by opening the arm microphone 3.

Such key-lock function prevents operation keys from being inadvertently pressed to start malfunction while the portable telephone apparatus 1 is put in a pocket or a bag.

On the other hand, the main body 2 of the apparatus is provided with the various operation keys and a signal processing circuit. A speaker 4 paired with the arm microphone 3, a liquid crystal display (LCD) 5, and plural operation keys 6 to which various functions are assigned are provided on the surface of the main body 2 of the apparatus. A central processing unit (CPU) 7 which uses those as input/output devices is built into the main body.

The CPU 7 controls the liquid crystal display 5 via a liquid crystal display driver 5A to display information according to an instruction input from the operation keys 6 with a character font of an appropriate size. In addition, the CPU 7 controls a transmitter-receiver circuit part 10 to transmit and receive information to and from a base station apparatus via an antenna 11 connected to the part 10. The CPU 7 operates based on programs stored in a read only memory (ROM) 8 and data read into a random access memory (RAM) 9.

In this connection, a card socket 13 is connected to the CPU 7, and management information on subscribers is read from a subscriber ID card 12 (in this embodiment, a subscriber identity module (SIM) card) inserted into the card socket 13 and utilized for controlling.

In this connection, the liquid crystal display 5 comprises a matrix of pixels having, for instance, 40 dots×97 dots, and these dots can be used to display information with two types of fonts. One of the fonts is a small font for displaying one character with, for instance, vertical 7 dots×lateral 5 dots, while the other is a large font for displaying one character with, for instance, vertical 15 dots×lateral 8 dots. Therefore, the use of the small font enables vertical five characters and lateral sixteen characters (that is, characters of 5 rows×16 columns) to be displayed, while the use of the large font enables vertical two characters and lateral ten characters (that is, characters of 2 rows×10 columns) to be displayed.

As a general rule, the large font is used to display the characters input by the user, while the small font is used to display the message from the apparatus. However, if the number of characters input by the user exceeds a predetermined number (for instance, about twenty characters), the font size is automatically switched from the large font to the small font.

Such a font-switching function enables large characters to be input with the contents of input confirmed while the number of the input characters is small, thereby incorrect inputs can be reduced. Moreover, if the number of the characters is large, the input information on the same item can be checked on a screen, and the contents of input can be easily understood.

Next, the operation keys 6 provided on the main body 2 of the apparatus will he explained. In the case of this embodiment, the operation keys 6 comprises ten keys: a power key 6A, numerical keys 6B of "0" to "9", a "#" key 6C, a "*" key 6D, a send key 6E, an end key 6F, a menu key 6G, a clear key 6H, a record key 6I, and a jog dial 6J. The operation keys 6A to 6H are disposed on the front surface of the main body 2 of the apparatus, and the remaining two operation keys 6I and 6J are disposed on the sides of the main body 2 of the apparatus.

The main functions assigned to respective operation keys are as follows. At first, the power key 6A is a key for supplying power to an internal circuit in the main body 2 of the apparatus. The power is turned on by the first push-down operation, and the power is turned off by the second push-down operation. However, in the case where the personal identity number (PIN) has not been input by the user during thirty seconds after turning-on of the power through the Power key 6A, the CPU 7 detects this to automatically turn the power off. This prevents the power from remaining turned on due to malfunction.

Next, ten numerical keys 6B will be explained. These ten numerical keys 6B are used to input not only numerals but also alphabet. In the case of this embodiment, the plural alphabetical characters are assigned to each of the eight numerical keys "2" to "9" excluding "0" and "1", thereby alphabet can be input through these keys. For instance, "a" to "c" are assigned to the "2" key, "d" to "f" are assigned to the "3" key, and the other alphabetical characters are likewise assigned to the other keys.

At the time of inputting alphabet, the first character can be input by pushing the same key once, the second character can be input by pushing the same key twice, and the third character can be input by pushing the same key three times, in sequence.

The send key 6E is a key for inputting the operation start command at the time of calling a telephone number, manually input through the numerical keys 6B, or a destination telephone number, selected from the screen of telephone-directory list. In addition, the send key 6E is used to call the history of past dials.

The end key 6F is a key for inputting a speech end command. In this connection, the speech end command can also be input by closing the arm microphone 3.

The menu key 6G is used to switch the screen, displayed on the liquid crystal display 5, between the initial screen and the menu screen. Usually, the portable telephone apparatus 1 displays time, and so on, as the initial screen. When the menu key 6G is pushed in this state, the display can be switched to the menu screen for setting the various functional items. Besides, if the menu key 6G is pushed while the menu screen is being displayed, the display can immediately return to the initial screen regardless of whatever screen is being displayed.

Besides, the menu key 6G is assigned a function as the only operation key which can cancel the key-lock state. That is, as described above, the apparatus is normally in the key-lock state while the arm microphone 3 is closed, however, when the menu key 6G is pushed, it is able to escape from key-lock state and to move to key-active state.

The record key 6I is a key which is used to record conversations and to reproduce the recorded conversations, and the key 6I is mounted on the top surface of the main body 2 of the apparatus opposite to the arm microphone 3 so as to be operated by the user's hand holding the main body 2 of the apparatus.

Finally, the jog dial 6J having the central function within the ten operation keys will be explained. The jog dial 6J is provided in the upper part of the side of the main body 2 of the apparatus opposite to the arm microphone 3 and near the speaker 4, and can be operated by the user's hand holding the main body 2 of the apparatus just as the record key 6I.

Figure 3:
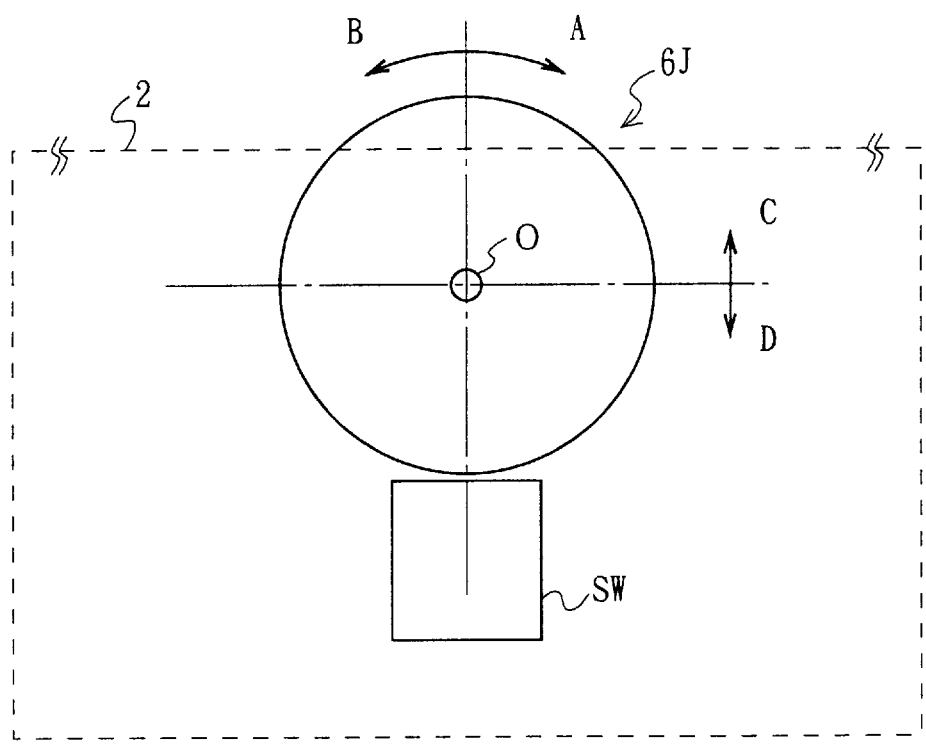
FIG. 3 is a schematic diagram showing a mechanism of the jog dial schematically.

The jog dial 6J can be independently operated in the circumferential direction and the radial direction. As shown in FIG. 3, it comprises a disc-like member (consisting of a rotary encoder) which rotates around a rotation axis O in the circumferential direction (as shown by the arrows A and B), a slide plate (not shown) which can slide in the radial direction (as shown by the arrows C and D), and a slide switch SW.

In this connection, the slide plate and the slide switch SW are urged in the direction shown by the arrow C. Besides, the rotation axis O is fixed to the slide plate. When the jog dial 6J is pushed in the direction shown by the arrow D, the rotary encoder can slide integrally with the slide plate to push down the slide switch SW in order to turn the switch on. The CPU 7 discriminates whether or not the jog dial 6J has been clicked, by detecting the ON/OFF state of the slide switch SW.

Figure 4A:
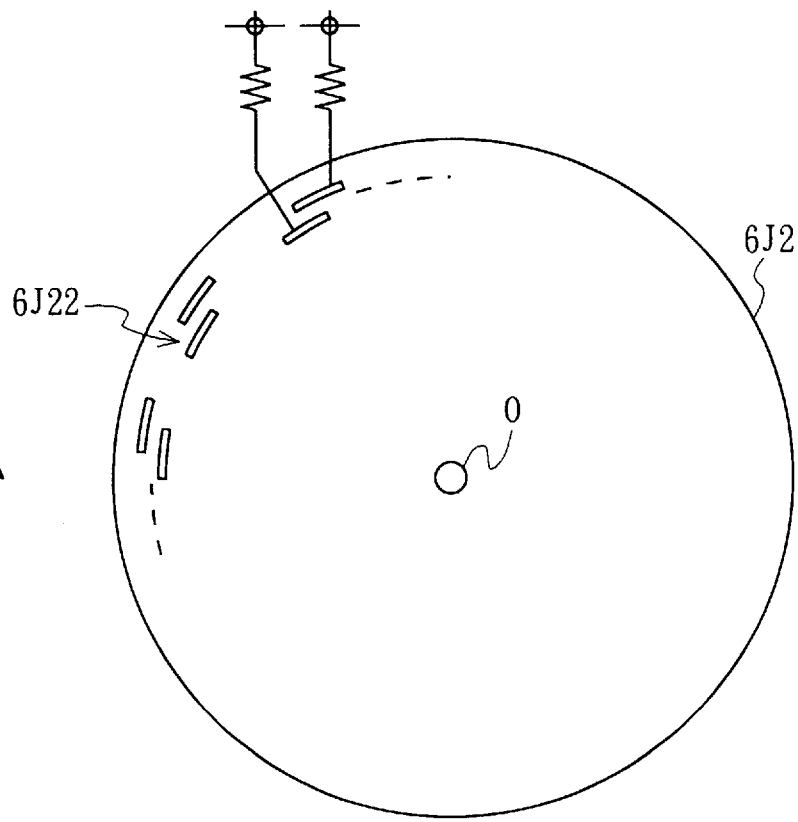
FIGS. 4A and 4B are schematic diagrams showing a constitution of a rotary encoder.
Figure 4B:
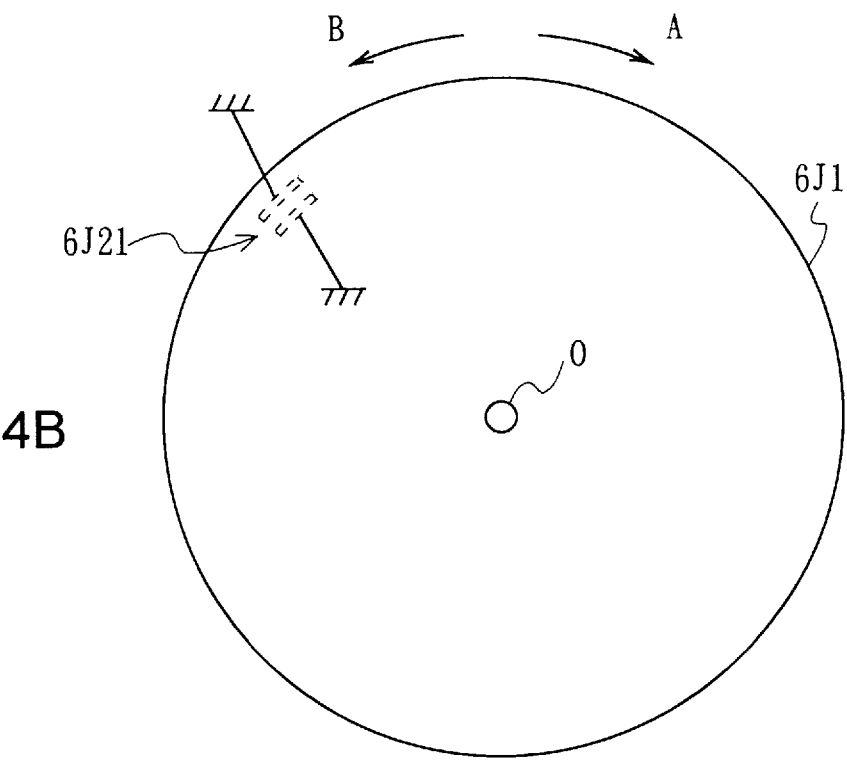

The rotary encoder which slides integrally with the slide plate comprises two discs 6J1 and 6J2, as shown in FIGS. 4A and 4B. The disc 6J1 is a movable member laminated on the top surface of the disc 6J2, and is mounted so as to rotate relative to the disc 6J2 fixed to the slide plate. The movable disc 6J1 has a pair of opposite electrodes 6J21. When assembled, the opposite electrodes 6J21 slidably contact twenty pairs of opposite electrodes 6J22 provided along the circumference of the disc 6J2. In this connection, the opposite electrodes 6J22 provided on the fixed disc 6J2, which are disposed on the inner and outer circumferential sides, respectively, are slightly offset from each other.

Figure 5A:
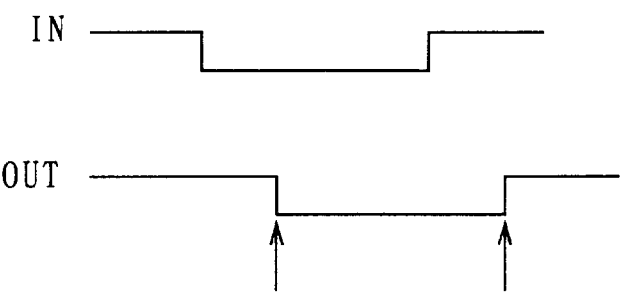
FIGS. 5A and 5B are diagrams showing the output waveform of the rotary encoder.
Figure 5B:
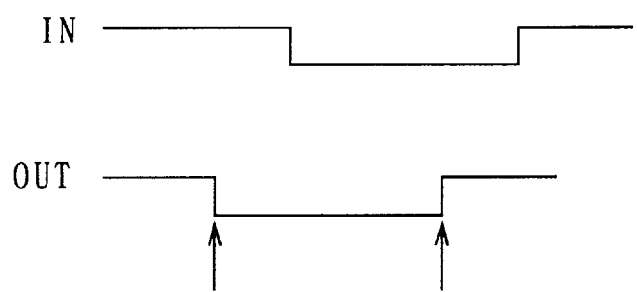

Therefore, as to the potential which is outputted from the opposite electrodes 6J22, when the jog dial 6J is rotated in the direction shown by the arrow A, the potential of the inner side falls to the earth potential first, as shown in FIG. 5A. On the contrary, when the jog dial 6J is rotated in the direction shown by the arrow B, the potential of the outer side falls to the earth potential first, as shown in FIG. 5B. using this nature, by detecting which of the inner side potential and the outer side potential falls first, the rotational direction of the jog dial 6J is detected. Besides, the rotation quantity of the jog dial 6J can be detected by counting the number of pulses output from the outer side electrodes.

Next, a typical example of operation using the jog dial 6J will be explained. By performing up or down operation of the jog dial 6J to the circumferential direction while various list screens are being displayed on the liquid crystal display 5, the cursor which is being displayed on the liquid crystal display 5 can be moved to the vertical direction. In this case, by pushing the jog dial 6J to the radial direction in this state (hereinafter, this is referred to as clicking), the CPU 7 can be instructed to read detailed information on the item on which the cursor is located or the item of the low hierarchy of the clicked item.

Besides, by rotating the jog dial 6J in the circumferential direction during a conversation, the loudness of the receiving sound can be adjusted. Also, by clicking the jog dial 6J during a conversation, the muting can be performed.

In view of the stream of realizing the high-level function of the portable telephone apparatus of recent years, the portable telephone apparatus 1 has various functions, such as the telephone directory function, the transfer function, the short-message transmission function, and the call out/in limit function. These functions are registered in the menu, and by calling out the menu screen, setting can be performed at any time according to the user's needs.

Figure 6:
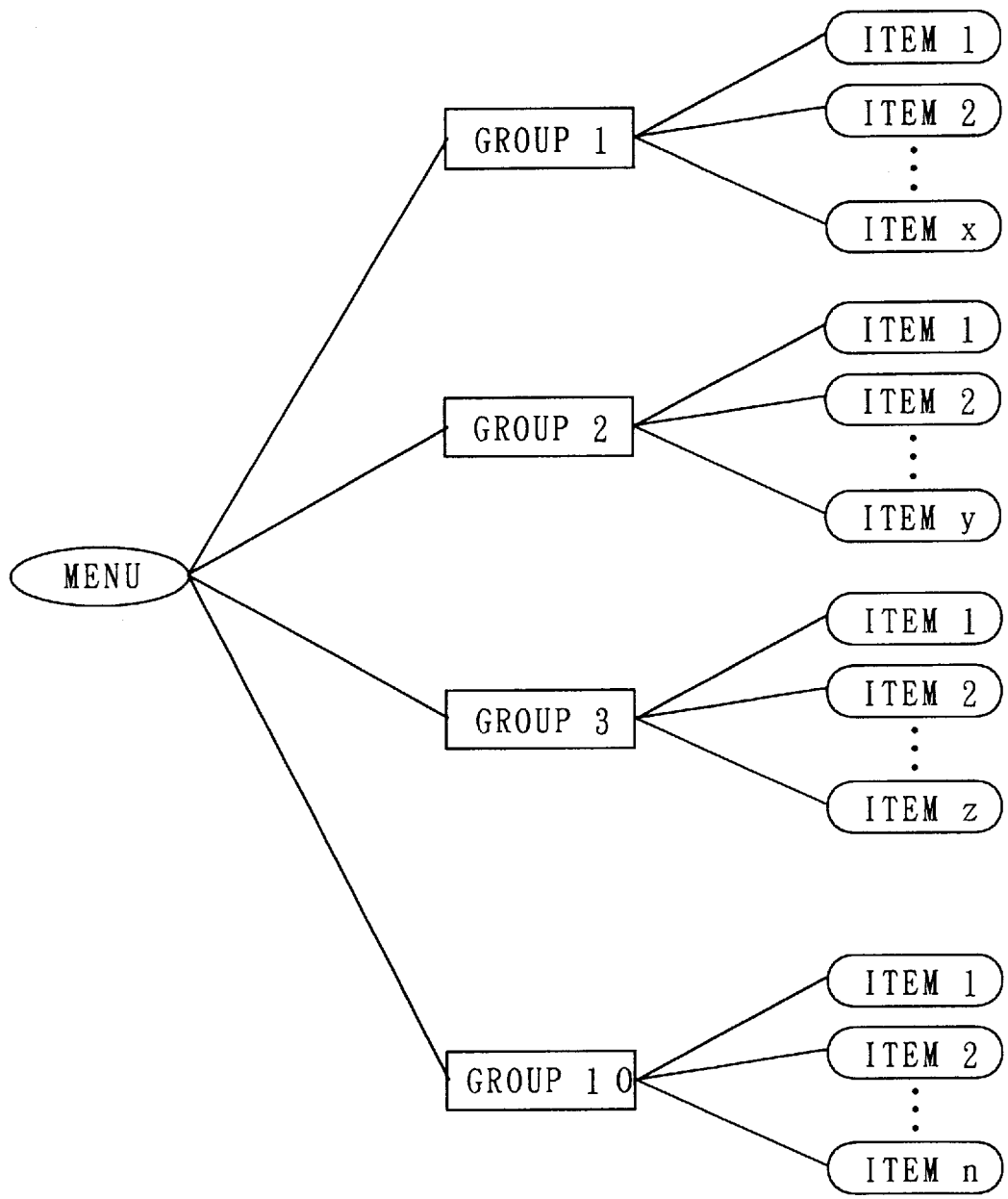
FIG. 6 is a schematic diagram explaining the menu structure according to the first embodiment.

The menu in the portable telephone apparatus 1 will be now explained. However, only the structure of the menu and its displaying method will be explained here, and the explanation of the contents of the functional items will be omitted. As shown in FIG. 6, the menu of the portable telephone apparatus 1 is first separated into ten groups of the related items, and then the respective functional items are contained under the respective groups; in this way, the menu is formed on the basis of so-called hierarchical structure. For instance, the functional items "1 to x" are contained in the low hierarchy of the group 1, and the functional items "1 to y" are contained in the low hierarchy of the group 2.

By the way, in the case of the menu which has hierarchical structure in this way, usually, there is such a possibility that the user can not recognize which hierarchy is being displayed when the list is displayed, as described in the above section "Description of the Related Art". For this reason, in the portable telephone apparatus 1, the screen layout is changed in accordance with the depth of hierarchy, so that it is facilitated to recognize which hierarchy in the menu the user in at the present time.

The concrete displaying method will be now explained with reference to the layout of the menu screen shown in FIGS. 7A to 7K, 8A to BJ, and 9A to 9J.

Figure 7A:
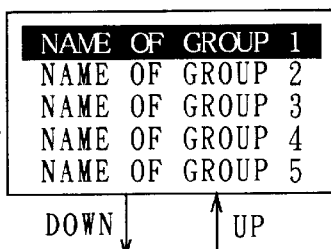

In the portable telephone apparatus 1, when the menu key 6G is pushed, the respective group names of the groups 1 to 5 are displayed on the liquid crystal display 5 as the first page of the menu screen, as shown in FIG. 7A. At this time, the cursor for indicating the portion which is being selected at present (that is, the portion of white-black inversion displaying) is positioned on the first line of the group 1, and each group name is displayed in a left-aligned manner with respect to the top of each line.

Figure 7B:
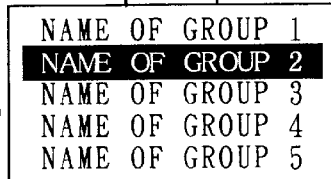
Figure 7C:
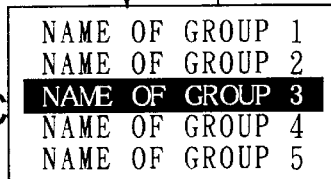
Figure 7D:
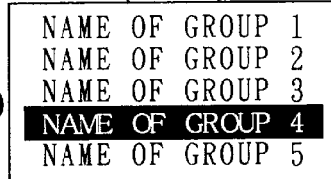

By rotating the jog dial 6J upwardly or downwardly in the first-page displaying (hereinafter, this is referred to as up or down operation), the cursor can be moved upwardly or downwardly. For instance, when down operation of the jog dial 6J is once performed in the state shown in FIG. 7A, the cursor can be lowered by one line and moved to the place of the group 2, as shown in FIG. 7B. When down operation of the jog dial 6J is further performed once in this state, the cursor can be further lowered by one line and moved to the place of the group 3, as shown in FIG. 7C. When down operation of the jog dial 6J is sequentially performed in like manner, the cursor can be moved to the forth line of the group 4 or the fifth line of the group 5, as shown in FIGS. 7D and 7E.

Figure 7E:
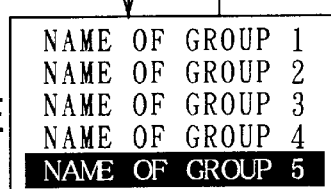

When up operation of the jog dial 6J is sequentially performed, the cursor can be sequentially moved upwardly line by line, as shown in FIGS. 7E to 7A.

Figure 7F:
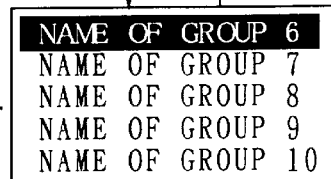

As shown in FIG. 7E, when down operation of the jog dial 6J is once performed in such a state that the cursor lies in the place of the group 5, which is the end of the first page of the menu screen, the groups 6 to 10 are displayed as the second page of the menu screen this time, as shown in FIG. 7F. At this time, as with the first page, each group name is displayed in a left-aligned manner with respect to the top of each line, in the second page too.

Figure 7G:
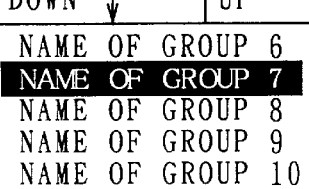
Figure 7H:
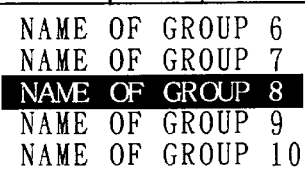
Figure 7I:
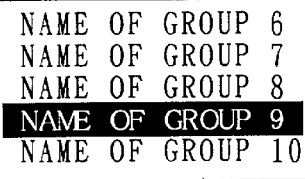

Besides, in the second page too, by performing up or down operation of the jog dial 6J, the cursor can be moved upwardly or downwardly. For instance, when down operation of the jog dial 6J is once performed in the state shown in FIG. 7F, the cursor can be moved to the second line of the group 7, as shown in FIG. 7G. When down operation of the jog dial 6J is further performed once in this state, the cursor can be moved to the third line of the group 8, as shown in FIG. 7H. When down operation of the jog dial 6J is sequentially performed in like manner, the cursor can be moved to the forth line of the group 9 or the fifth line of the group 10, as shown in FIG. 7I and FIG. 7J.

Figure 7J:
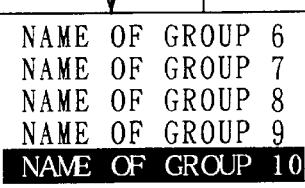

When up operation of the jog dial 6J is sequentially performed in contrast with this, the cursor can be sequentially moved upwardly line by line, as shown in FIGS. 7J to 7F.

Figure 7K:
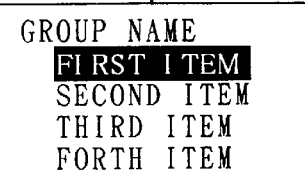

In the portable telephone apparatus 1, when the cursor is adjusted to the place of the desired group name and the jog dial 6J is clicked, the items of the low hierarchy of that group are displayed. For instance, when the jog dial 6J is clicked in such a state that the cursor lies in the place of the group 10 as shown in FIG. 7J, the functional items which belong to the group 10 are displayed as shown in FIG. 7K.

At this time, in the first line of the liquid crystal display 5, the name of the high hierarchy to which those functional items belong is displayed, that is, the group name is displayed in this case, while in the second line to the fifth line, the respective functional items are displayed. By virtue of displaying the name of the high hierarchy in the fifth line of the liquid crystal display 5 in this manner, the user is able to look at this and to easily understand whether he is in the low hierarchy or not at present, and he is also able to easily understand which hierarchy he is under.

Besides, each functional item is displayed in such a manner that it is indented by two characters from the head of each line. The display formats are changed between high hierarchy and low hierarchy in this way, therefore, the user is able to discover at a glance that he is in the low hierarchy, without reading of the group name.

Then, scroll displaying at the time of selection of the functional item in the low hierarchy is explained. When the jog dial 6J has been clicked and functional items have been displayed for the first time, four items, the first item to the fourth item, are displayed as the functional items, and the cursor is displayed at the place of the first item, as shown in FIG. 8A. When down operation of the jog dial 6J is once performed in this state, the cursor can be lowered by one line and moved to the place of the second item, as shown in FIG. 8B. When down operation of the jog dial 6J is further performed once in this state, the cursor can be further lowered by one line and moved to the place of the third item as shown in FIG. 8C.

By the way, as to display of functional items, page-scrolling system which has been used at the time of group displaying is not utilized, and, when down operation of the jog dial 6J is continuously performed, the list of the functional items is continuously shifted upwardly from midway, so that the entire list of the functional items is scrolled. That is, when down operation of the jog dial 6J is performed once in such a state that the cursor lies in the place of the third item as shown in FIG. 8C, the cursor is not lowered in the screen (that is, the cursor is left on the fourth line from the top in the screen) and, on the contrary, the list of the functional items is shifted upwardly by one row, as shown in FIG. 8D, so that the cursor is moved to the place of the fourth item and indicates the item. In this connection, in this case, the group name which is being displayed on the first line in the screen is not scrolled, and only the list of the functional items is scrolled.

When down operation of the jog dial 6J is further performed in the state shown in FIG. 8D, the cursor itself is not lowered and the list of the functional items is shifted upwardly by one row in like manner, as shown in FIG. 8E, so that the cursor is moved to the place of the fifth item and indicates the item. When down operation of the jog dial 6J is likewise performed continuously from this time, the list of the functional items is continuously shifted upwardly row by row, and the cursor is hereby moved to the places of the sixth item and the seventh item in sequence, as shown in FIGS. 8F to 8G.

When down operation of the jog dial 6J is performed in the case where the last functional item, the eighth item, is being displayed in the fifth line of the screen as shown in FIG. 8G, the list of the functional items is not shifted this time and the cursor is lowered by one line, so that the cursor is hereby moved to the place of the eighth item, as shown in FIG. 8H. The reason why the position of the cursor is thus changed with respect to the last functional item is to enable to easily find that it is the last functional item, on the basis of the cursor position in the screen.

When down operation of the jog dial 6J is further performed in such a state that the cursor lies in the place of the last functional item as shown in FIG. 8H, the first state is brought back and the first item to the fourth item are displayed, as shown in FIG. 8I. At this time, the cursor is displayed in the second line, that is, the place of the first item in the screen. From this time, when down operation is performed in like manner, the cursor is moved in the order of FIG. 8J, FIG. 8C, . . . .

When the jog dial 6J is clicked after the cursor has been thus adjusted to the desired functional item, entering to the setting mode of the functional item is achieved, and setting of the function can be performed. For instance, the jog dial 6J is clicked when the cursor is placed at the second item as shown in FIG. 8J, entering to the setting mode of the second item is achieved, and the setting can be performed.

On the contrary, in the case where up operation of the jog dial 6J has been performed, the display of the functional items is scrolled as shown in FIG. 9. That is, when up operation of the jog dial 6J is performed in such a state that the functional items have been first displayed as shown in FIG. 9A, the latter four items out of the functional items (that is, the fifth item to the eighth item) are displayed as shown in FIG. 9B. At this time, the cursor is displayed on the fifth line from the top in the screen, that is, on the place of the eighth item.

When up operation of the jog dial 6J is further performed in this state, the cursor is moved upwardly line by line in sequence, and moved to the places of the seventh item, the sixth item in sequence, as shown in FIGS. 9C and 9D.

When up operation of the jog dial 6J is further performed in the state shown in FIG. 9D, the cursor is not raised in the screen (that is, it is left on the second line from the top in the screen) and, on the contrary, the list of the functional items is shifted downwardly by one row, and the cursor is hereby moved to the place of the fifth item, as shown in FIG. 9E. In this connection, in this case, the group name which is being displayed on the first line in the screen is not scrolled, and only the list of the functional items is scrolled.

When up operation of the jog dial 6J is likewise performed continuously in sequence from this time, the list of the functional items is continuously shifted downwardly row by row, and the cursor is hereby moved to the places of the fourth item, the third item, and the second item in sequence, as shown in FIGS. 9F to 9H.

When up operation of the jog dial 6J is performed in the case where the first of the functional items is being displayed on the second line of the screen as shown in FIG. 9H, the functional items are not shifted and the cursor is raised by one line this time, so that the cursor is hereby moved to the place of the first item, as shown in FIG. 9I. The reason why the position of the cursor is thus changed with respect to the first functional item is to enable to easily find that it is the first of the functional items, on the basis of the cursor position in the screen.

When up operation of the jog dial 6J is performed in such a state that the cursor lies in the place of the first functional item as shown in FIG. 9I, the eighth item is displayed again and the cursor is displayed whereon as shown in FIG. 9J. When up operation is likewise performed from this time, the cursor is moved in the sequence of FIG. 9C, FIG. 9D, . . .

When the jog dial 6J is clicked after the cursor has been thus adjusted to the desired functional item, entering to the setting mode of the functional item is achieved as stated above, so that setting of the function can be performed.

Figure 10:
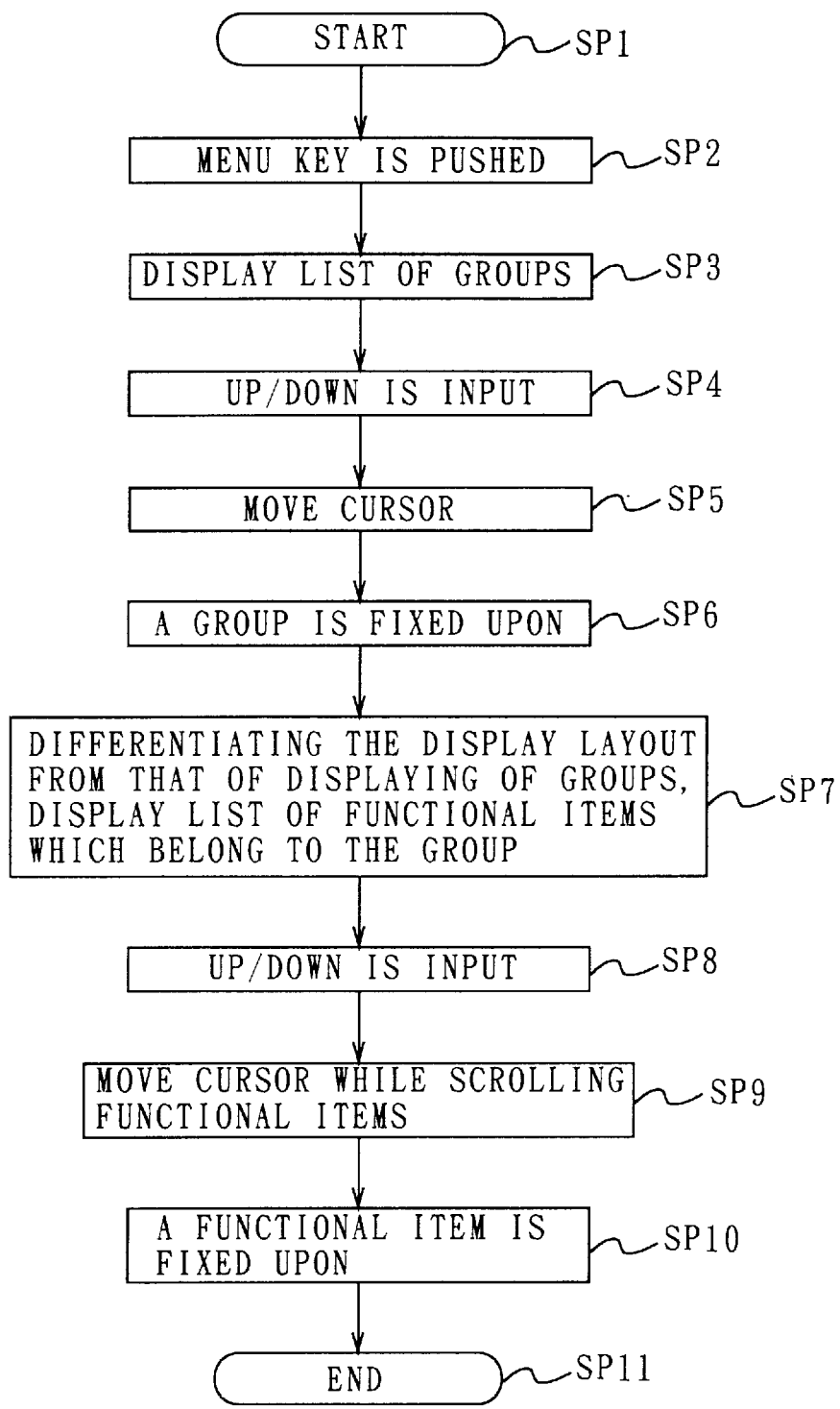
FIG. 10 is a flow chart showing the procedure of the menu displaying according to the first embodiment.

The display of these menu screens are performed under the display controlling of the CPU 7; the procedure of that time will be explained referring to the flow chart shown in FIG. 10.

First, at the step SP2 following the step SP1, the menu key 6G is pushed by the user. Accepting this, the CPU 7 proceeds to the following step SP3 in order to display the list of the groups which are the high hierarchy of the menu on the liquid crystal display 5. At this time, the group 1 to the group 5 are displayed as the first page of the menu screen.

After displaying, the user operates the jog dial 6J so as to input up or down, at the following step SP4. Accepting this, the CPU 7 proceeds to the following step SP5 in order to move the cursor which is being displayed in the screen. At this time, in the case where the moving quantity which is specified with the up or down operation ranges to the second page of the menu screen, the display is switched to the groups 6 to 10 which are the second page, and the cursor is moved (that is, the display of the groups is performed in such a manner that the pages are turned, and the cursor is moved).

At the step SP6, when the jog dial 6J is clicked after the cursor has been adjusted to the place of the desired group, this group is fixed upon, and then the CPU 7 proceeds to the following step SP7.

At the step SP7, the list of the functional items which lie in the low hierarchy of the fixed group is displayed, where the display layout of the display is differentiated from that of the previous display of the groups. Specifically, the group name is displayed on the first line of the screen and the functional items are displayed on the second line to the fifth line of the screen, as described above. Besides, each functional item is displayed such that it is indented from the head of each line.

After the functional items have been thus displayed, the user operates the jog dial 6J so as to input up or down, at the following step SP8. Accepting this, the CPU 7 proceeds to the following step SP9 in order to move the cursor which is being displayed in the screen. At this time, in the case where such an up-or-down command is received that the cursor is to be moved to the portion other than the functional item which is being displayed at present on the screen, the list of the functional items is sequentially shifted so as to display the specified item portion, and the cursor is moved to this item portion. That is, with respect to the functional items, the desired functional item is not displayed in the page-turning manner like the manner of group display, but is displayed by sequentially shifting the list of the functional items.

At the step SP10, when the user clicks the jog dial 6J after the cursor has been adjusted to the place of the desired functional item, this functional item is fixed upon, and the CPU 7 enters the setting mode for setting this functional item. When this is completed, the CPU 7 proceeds to the following step SP11, and the procedure of the menu display is ended.

With the above constitution, in the case of this embodiment, when the menu key 6G is pushed, the list of the groups which are the high hierarchy of the menu is first displayed. When the jog dial 6J is clicked after the user has operated the jog dial 6J and adjusted the cursor to the place of the desired group, the list of the functional items which belong to the selected group is displayed this time. When the jog dial 6J is clicked after the user has again operated the jog dial 6J in this state and adjusted the cursor to the place of the desired functional item, the CPU 7 enters the setting mode of the selected functional item in order to perform data processing corresponding to the functional item.

By the way, in the case of this embodiment, the display layout of the case where the groups which are the high hierarchy are displayed and the display layout of the case where the functional items which are the low hierarchy of the groups are displayed have been differentiated. To put it concretely, at the time of the display of the groups, the list of the group names is displayed in a left-aligned manner and in regular order from the top of the screen, while, at the time of the display of the functional items, the group name which is the high hierarchy of the functional items is displayed on the top line of the screen, and the functional items are displayed in such a manner that they are indented from the heads of the lines.

In this way, at the time of the display of the functional items which are the low hierarchy, the name of the group which is their high hierarchy is also displayed; therefore, the user is able to easily understand that the functional items of the low hierarchy are being displayed at present by looking at the group name, and also able to easily understand to which high hierarchy the functional items being displayed belong.

Besides, at the time of the display of the functional items of the low hierarchy, each functional item is displayed in such a manner that it is indented from the head of the line so as to provide a blank portion on the head of the line; therefore, the user is able to easily understand that the functional items which are the low hierarchy are being displayed at present, by glancing at the display, without reading of the group name.

Besides, in the case of this embodiment, at the time of the display of the groups which are the high hierarchy, such page scrolling is performed that the pages are turned sheet by sheet, and, at the time of the display of the functional items which are the low hierarchy, such scrolling is performed that the functional items are sequentially shifted. In this way, the scrolling method of the case where the groups which are the high hierarchy are displayed and the scrolling method of the case where the functional items which are the low hierarchy are displayed have been differentiated; therefore, by looking at this, the user is able to understand whether the high hierarchy is being displayed or the low hierarchy is being displayed.

According to the above constitution, by differentiating between the display layouts of the case where the items of the high hierarchy are displayed and the case where the items of the low hierarchy are displayed, the user is able to easily know which hierarchy is being displayed in present, and hereby able to easily find the object item. As a result, such a portable telephone apparatus can be realized that is able to provide a display on which the object item can be easily found by the user, at the time of the display of the list of the plural items.

In the explanation of the aforementioned first embodiment, such a case has been described that the menu has been formed into hierarchical structure and hierarchically displayed in accordance with the structure. However, in this second embodiment, the menu is formed into planar structure on the basis of simple grouping, and a group's name and items' names which belong to the group are concurrently displayed, so as to ease finding of the object item.

Referring to FIG. 11, the menu of the second embodiment is explained. In this second embodiment, functional items are separated into, for instance, three groups on the basis of correlation between the respective items, as shown in FIG. 11. However, the functional items are not enveloped in the respective groups as the first embodiment, but only separated into groups. For instance, grouping is performed such that the group 1 is comprised of six functional items, the group 2 is comprised of seven functional items, and the group 3 is comprised of three functional items. Upon grouping in this way, a groups name and functional items' names are concurrently displayed.

That is, in the case of this embodiment, the menu structure itself which is shown in FIG. 11 is considered to be a list, and the list is sequentially scrolled so that all functional items are displayed. Therefore, the user is able to see both of the group name and the functional item names at a same time, and, on the basis of this two information, able to easily judge the positional difference between the portion which is now displayed and the object functional item, and to find out the object functional item with ease.

Because the group name is displayed in the case of the first embodiment too, such a point is common that the positional difference between the portion which is now displayed and the object functional item can be easily judged. However, in the case of the first embodiment, since it has hierarchical structure basically, when the group of the object functional item differs from the group of the functional item which is being displayed at present, the display must be once returned to the high hierarchy and then the group which includes the object functional item must be selected afresh, therefore, the number of steps which are needed to display the object functional item is increased. On the other hand, in the case of the second embodiment, scrolling of the list of the items is merely required because it has no hierarchical structure, and the number of steps which are needed to display the object functional item is not increased.

By the way, in the case of the second embodiment, a long side-ways liquid crystal display is needed, in order to display the menu structure shown in FIG. 11 as a single list. For that reason, in this second embodiment, a long side-ways liquid-crystal display which is able to display, for instance, 4 lines×18 columns of characters is used. In this connection, supposing that the display is performed with a small font of vertical 7 dots×lateral 5 dots like the first embodiment, that which has the pixels of about 32 dots×109 dots may be used.

Referring to the display layout diagrams shown in FIGS. 12 to 15, the menu display in the second embodiment is described hereinafter.

Figure 12A:
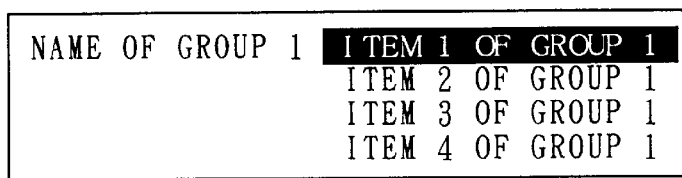

When the menu key 6G is pushed at first, in the portable telephone apparatus of this embodiment, the initial four items out of the group 1 are displayed as shown in FIG. 12A. At this time, the name of the group is displayed on the upper left portion of the screen, and four functional items are displayed on the right side of the screen in regular order from the top. Besides, the cursor for indicating the portion which is being selected at present is displayed on the place of the first functional item.

Figure 12B:
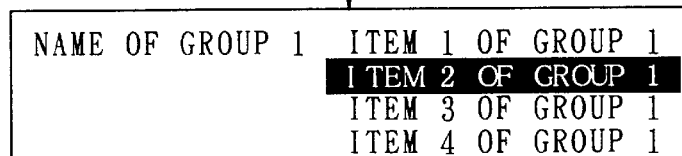
Figure 12C:
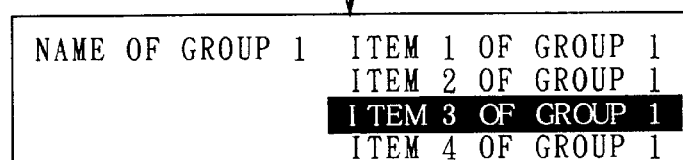

When down operation of the jog dial 6J is once performed in this state, the cursor is lowered by one line and moved to the place of the second functional item, as shown in FIG. 12B. When down operation of the jog dial 6J is performed once more, the cursor is further lowered by one line and moved to the place of the third functional item, as shown in FIG. 12C.

Figure 12D:
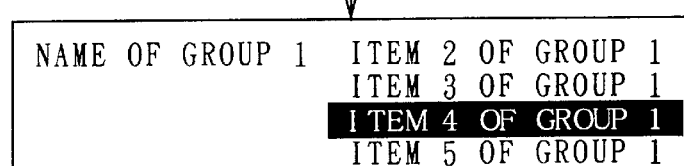

When down operation of the jog dial 6J is performed once more in this state, the cursor is not lowered (that is, it is caused to stay on the third line from the top of the screen) but the list of the functional items is shifted upwardly by one row, and the cursor is hereby moved to the place of the fourth functional item, as shown in FIG. 12D. At this time, the group name is not shifted and still displayed on the upper left portion of the screen.

Figure 12E:
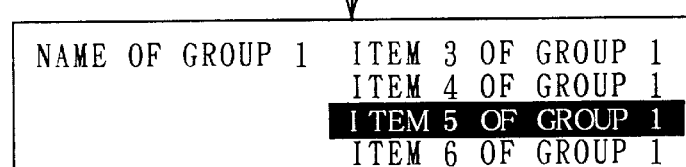

When down operation of the jog dial 6J is performed once more in like manner, the functional item list is shifted upwardly by one row so that the cursor is moved to the place of the fifth item as shown in FIG. 12E.

Figure 12F:
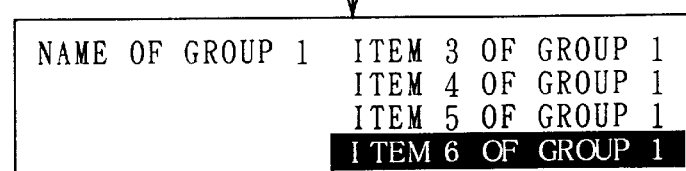

When down operation of the jog dial 6J is once performed in such a state that the last item of the group 1, that is, the sixth functional item, is displayed on the fourth line of the screen as shown in FIG. 12E, the functional item list is not shifted this time and the cursor is lowered by one row, so that the cursor is moved to the place of the sixth item, as shown in FIG. 12F. The aim of the fact that the functional item list is not shifted and the cursor is lowered in this way at the time of the last functional item is to cause the user to know that it is the last functional item.

Figure 12G:
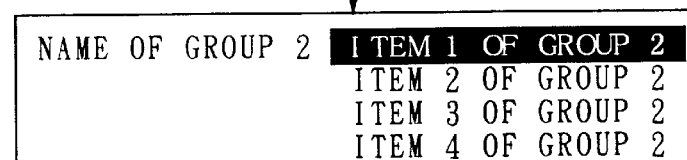

When down operation of the jog dial 6J is further performed in such a state that the cursor lies in the place of the last functional item of the group 1 as shown in FIG. 12F, the functional items of the group 2 are displayed this time as shown in FIG. 12G. At this time, since the group has been changed, the group name which is displayed on the upper left of the screen is switched from the group 1 to the group 2. Besides, the initial four items out of the group 2 are displayed as the functional items, and the cursor is displayed on the place of the first functional item.

Figure 13H:
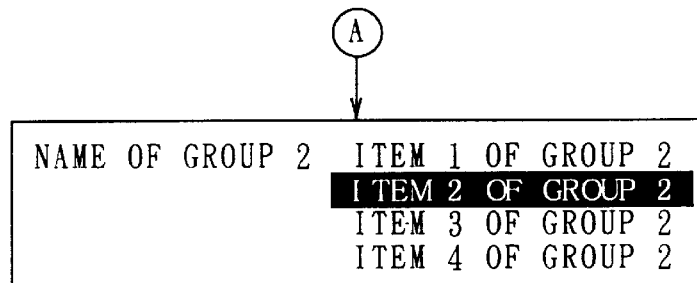
Figure 13I:
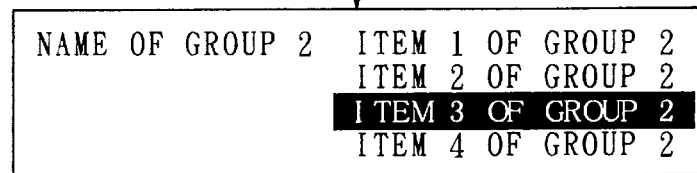

When down operation of the jog dial 6J is performed sequentially in this state, the cursor is lowered one line at a time in regular order, and moved to the place of the second functional item and then to the place of the third functional item, as shown in FIGS. 13H and 13I.

Figure 13J:
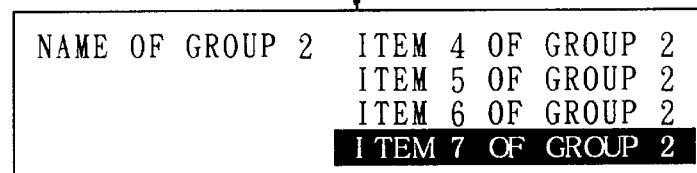

After this, when down operation of the jog dial 6J is performed, the cursor is moved to the place of the seventh functional item, which is the last functional item of the group 2, as shown in FIG. 13J. At this time too, the list of the functional items is not shifted and the cursor is lowered by one line, so that the cursor is moved to the place of the seventh functional item, as with the aforementioned case.

Figure 13K:
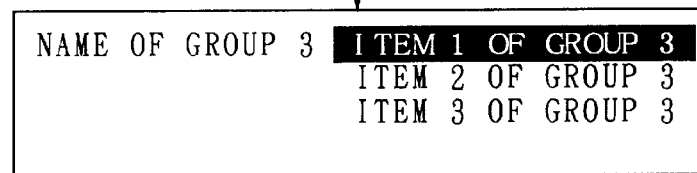

When down operation of the jog dial 6J is performed once more in such a state that the cursor lies in the place of the last functional item of the group 2 as shown in FIG. 13J, the functional items of the group 3 are displayed this time as shown in FIG. 13K. In this case too, the group name which is displayed on the upper left of the screen is switched to the group 3, and the cursor is displayed on the place of the first functional item, as with the aforementioned case.

Figure 13L:
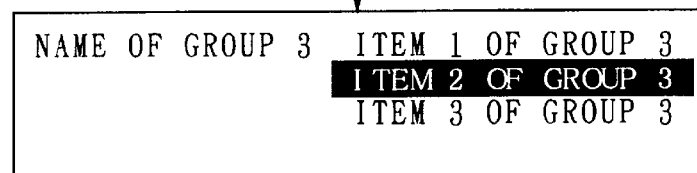
Figure 13M:
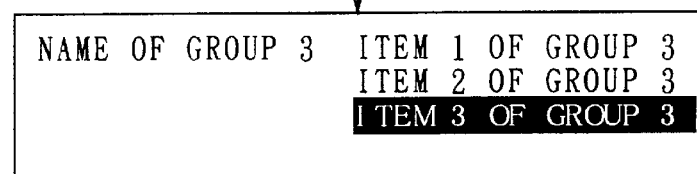

When down operation of the jog dial 6J is performed sequentially in the same way, the cursor is lowered one line at a time in regular order, and moved to the place of the second functional item and then to the place of the third functional item, as shown in FIGS. 13L and 13M.

Figure 13N:
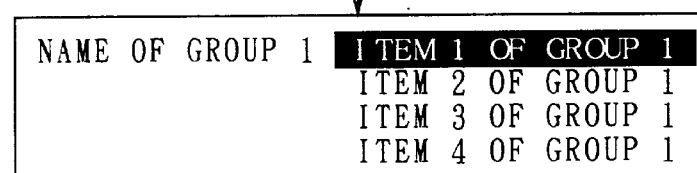

When down operation of the jog dial 6J is further performed in such a state that the cursor lies in the place of the last functional item of the group 3 as shown in FIG. 13M, the display is returned again to the group 1 repeatedly, as shown in FIG. 13N.

Figure 14A:
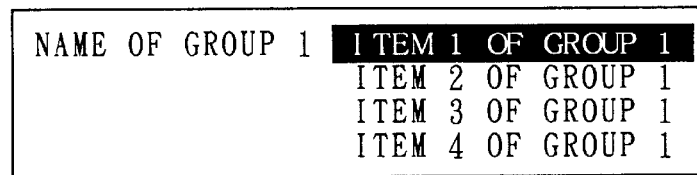
Figure 14B:
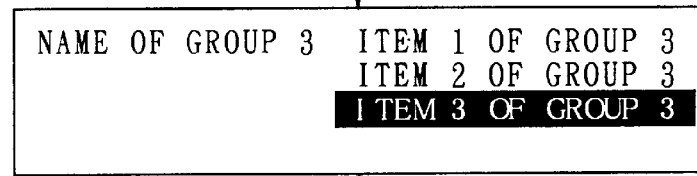

In contrast with this, when up operation of the jog dial 6J is performed, the functional items are displayed in a manner shown in FIGS. 14A to 14G and 15H to 15L. That is, when up operation of the jog dial 6J is performed in such a state that the menu key 6G has been pushed and the functional items have been first displayed (that is, such a state that the functional items of the group 1 are being displayed as shown in FIG. 14A), the functional items of the group 3 are displayed as shown in FIG. 14B. At this time, the group name of the group 3 is displayed on the upper left of the screen in like manner, and the cursor is displayed on the place of the third functional item, which is the last functional item of the group 3.

Figure 14C:
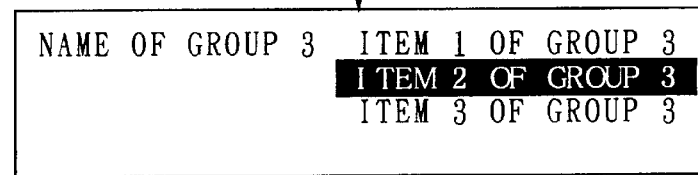
Figure 14D:
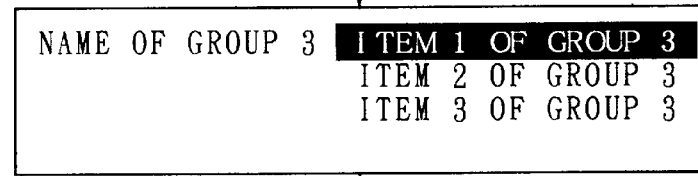

When up operation of the jog dial 6J is further performed continuously in this state, the cursor is raised one line at a time, and moved to the place of the second functional item and to the place of the first functional item in regular order, as shown in FIG. 14C and FIG. 14D.

Figure 14E:
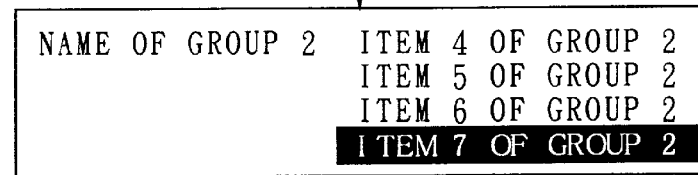

When up operation of the jog dial 6J is further performed in such a state that the cursor lies in the place of the first functional item as shown in FIG. 14D, the functional items of the group 2 are displayed this time as shown in FIG. 14E. At this time, the group name of the group 2 is displayed on the upper left of the screen in like manner, and the cursor is displayed on the place of the seventh functional item, which is the last functional item of the group 2.

Figure 14F:
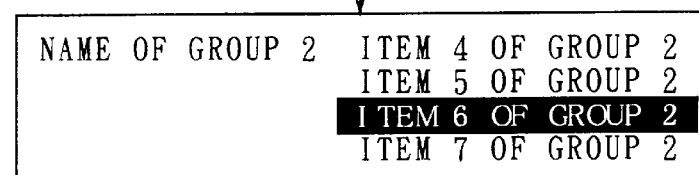
Figure 14G:
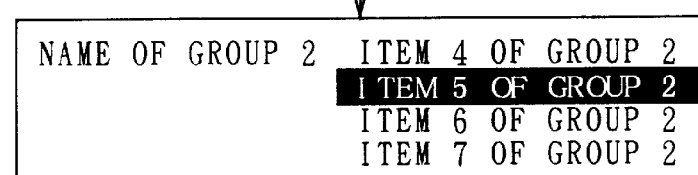

When up operation of the jog dial 6J is further performed in this state, the cursor is raised one line at a time in regular order, and moved to the place of the sixth functional item and then to the place of the fifth functional item, as shown in FIG. 14F and FIG. 14G.

When up operation of the jog dial 6J is performed in such a state that the cursor lies in the second line from the top as shown in FIG. 14G, the cursor is not raised (that is, the cursor stays at the second line) and the list of the functional items is shifted by one row, so that the cursor is moved to the place of the fourth functional item, as shown in FIG. 15H.

When up operation of the jog dial 6J is performed continuously in like manner, the functional item list is shifted downwardly in regular order so that the cursor is moved to the place of the third item and then the place of the second item, as shown in FIG. 15I and FIG. 15J.

When up operation of the jog dial 6J is performed in such a state that the first functional item of the group 2 is being displayed on the first line of the screen as shown in FIG. 15J, the functional item list is not shifted this time and the cursor is raised by one row, so that the cursor is hereby moved to the place of the first item as shown in FIG. 15K. The aim of the fact that the functional item list is not shifted and the cursor is raised in this way at the time of the first functional item is to cause the user to know that it is the first functional item.

When up operation of the jog dial 6J is performed in such a state that the cursor lies in the place of the first functional item as shown in FIG. 15K, the functional items of the group 1 are displayed again as shown in FIG. 15L. At this time, the rear four functional items out of the functional items of the group 1 are displayed, and the cursor is displayed on the place of the sixth functional item, which is the last functional item of the group 1.

In this way, in the case of this embodiment, when up or down operation of the jog dial 6J is performed, scroll-displaying of the respective functional items of the group 1 to the group 3 is performed, and so it is able to adjust the cursor to the place of the desired functional item without switching of hierarchy. When the jog dial 6J is clicked after the cursor has been adjusted to the place of the desired functional item in this way, it is able to enter the setting mode of the very functional item and to perform setting with respect to this functional item.

Figure 16:
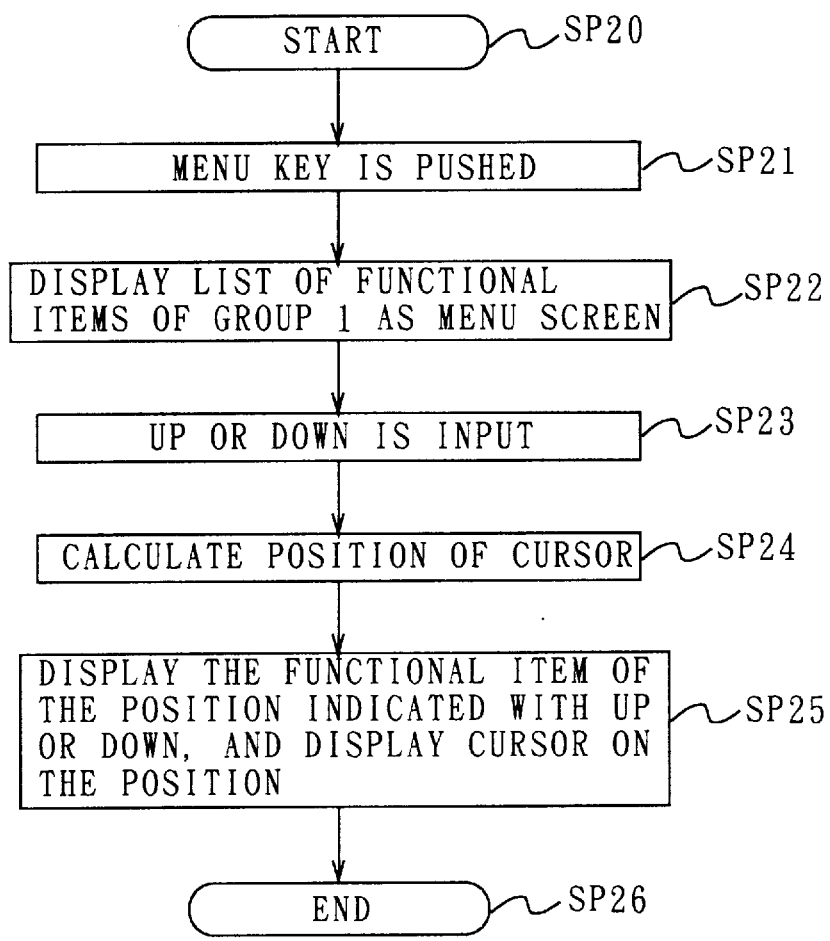
FIG. 16 is a flow chart showing the procedure of the menu displaying according to the second embodiment.
Figure 17A:
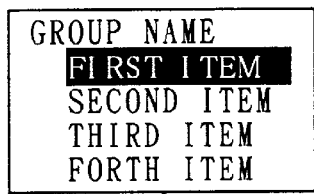
FIGS. 17A to 17J are schematic diagrams explaining the case where the display layout has been changed by changing the character font.
Figure 17B:
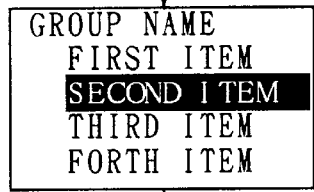
Figure 17C:
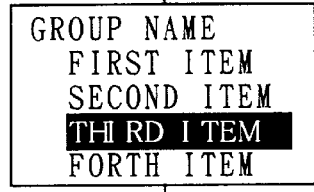
Figure 17D:
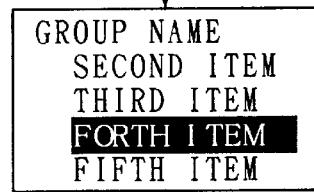
Figure 17E:
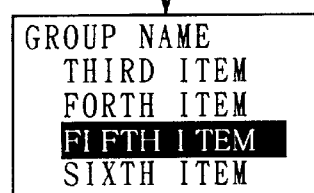
Figure 17F:
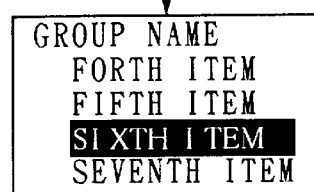
Figure 17G:
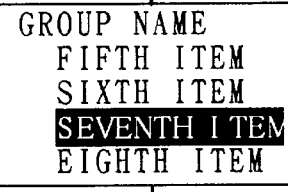
Figure 17H:
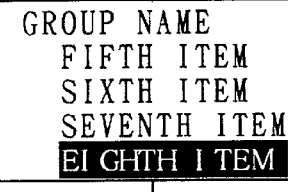
Figure 17I:
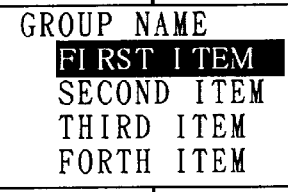
Figure 17J:
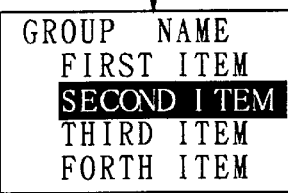

The display of these menu screens is performed under the display controlling of the CPU 7; the procedure of that time is described hereinafter referring to the flow chart shown in FIG. 16.

First, the menu key 6G is pushed by the user, at the step SP21 which is following to the step SP20. Accepting this, the CPU 7 goes to the following step SP22, and displays the list of the functional items of the group 1 as the menu screen. At this time, the name of the group 1 is displayed on the upper left portion of the screen as the group name, and the cursor is displayed on the place of the first functional item, which is the foremost functional item of the group 1 (see FIG. 12A or FIG. 14A).

Next, at the step SP23, up or down operation of the jog dial 6J is performed by the user. Accepting this, the CPU 7 goes to the following step SP24 and, at here, calculates the position of the cursor which is instructed with the up or down operation.

On the basis of the result of the aforementioned calculation, the portion of the functional item list which has been instructed with the up or down operation is displayed, and the cursor is displayed on that portion, at the next step SP25. As an example, if the up or down operation ranges to the item 3 of the group 2, then the functional item list is scrolled so as to display the item 3 of the group 2, and the cursor is displayed on this portion. In this case too, the name of the group which includes the functional items which are being displayed on the screen at present is displayed on the upper left of the screen.

After this, when the user clicks the jog dial 6J, entering into the setting mode of this functional item is achieved, and the procedure of the menu display advances to the step SP26 so as to end the processing.

In the above constitution, in the case of this second embodiment, when the menu key 6G is pushed, the list of the first functional item to the fourth functional item of the group 1 is displayed at first. At this time, the name of the group 1 is displayed on the upper left of the screen as the group name, and the cursor is displayed on the place of the first functional item out of the functional items which are being displayed. In this state, when the jog dial 6J is clicked after the jog dial 6J has been operated and the cursor has been adjusted to the place of the desired functional item, entering into the setting mode of the selected functional item is achieved, and setting with respect to the functional item can be performed.

By the way, in the case of this second embodiment, the functional items are separated to form some groups, and, at the time of the display the list of the functional items, the name of the group is displayed; therefore, taking the group's name as a guide, the object functional item can be easily found out.

Besides, in the case of this second embodiment, the structure is such that the functional items have been only separated to form some groups (that is, the structure is not hierarchical structure); therefore, when the functional item which is being displayed at present is different from the object functional item, the object functional item can be easily found out by only operating the jog dial 6J and scrolling the functional item list. In this connection, in the case of the hierarchical structure like the first embodiment, when the functional item which is being displayed at present is different from the object functional item, it may be obliged to return to the high hierarchy; however, such troubles do not exist in the case of this second embodiment, and so the user's trouble is omitted and the function can be improved in addition.

According to the above constitution, owing to the fact that functional items are separated to form some groups and, at the time of the display the list of the functional items, the name of the group is displayed, the user is able to find out the object functional item taking the groups name as a guide, therefore, the object functional item can be found out with ease. In this manner, a portable telephone apparatus can be realized which is able to provide a display on which the user can easily find out the object item at the time of the display of the list of plural items.

While in the aforesaid first embodiment, the functional items have been displayed in an indented manner at the time of the display of the functional items which are the low hierarchy, and the display layout of it has been hereby differentiated from that of the display of the groups which are the high hierarchy, however, the present invention is not limited thereto and, as shown in FIGS. 17A to 17J, at the time of the display of the functional items the character font can be changed so as to change the shape of the displayed characters, and the display layout of it can be differentiated from that of the display of the high hierarchy. also, the size of the character font can be changed. Alternatively, for instance, a color liquid crystal display can be employed, and the display layouts of the high hierarchy and the low hierarchy can be differentiated by changing the color of the screen. To be short, if the display layouts are differentiated between the high hierarchy and the low hierarchy, it can be discriminated in which hierarchy the user is at present, and the same effects as the above can be obtained.

Further, while in the aforesaid first embodiment, the indention has been performed by two characters from the head of the line at the time of displaying the functional items which are the low hierarchy, however, the present invention is not limited thereto and the indention can be performed by one character from the head of the line, at the time of displaying the functional items. In brief, if the display positions of the items are differentiated between the high hierarchy and the low hierarchy, the same effects as the above can be obtained.

Further, while in the aforesaid first embodiment, the structure of the menu has been settled to the two-stage hierarchical structure, however, the present invention is not limited thereto and even the case where the hierarchical structure is other than such, by changing the display layout in accordance with the depth of the hierarchy, the same effects as the above can be obtained.

Further, while in the aforesaid first embodiment, the liquid crystal display apparatus can perform the display of 5 lines×16 columns, however, the present invention is not limited thereto and even the case where a liquid crystal display apparatus having the other number of lines or the other number of columns is employed, the same effects as the above can be also obtained. However, a liquid crystal display which can perform the display of three lines or more is preferable, in order to offer the user a display which is easy to recognize.

Further, while in the aforesaid second embodiment, the boundary of the group has been noticed to the user by changing the position of the cursor at the place of the first or the last functional item of the group (see FIG. 12F, FIG. 15K, etc.), however, the present invention is not limited thereto and the boundary of the group can be noticed by displaying a broken line, etc. for indicating the boundary of the group, as shown in FIG. 18. Alternatively, the other line, character, sign, etc. for indicating the boundary of the group can be displayed. In brief, if the information which indicates the boundary of the group is displayed, the user can recognize the end or the beginning of the group by viewing the display.

Further, while in the aforesaid second embodiment, the group name has been displayed on the upper left side of the liquid crystal display, however, the present invention is not limited thereto and the group name can be displayed on the upper side of the functional items in the same way as the first embodiment, and, alternatively, the group name can be displayed on the other position of the screen. In brief, the display position of the group name is not limited in the present invention.

Further, while in the aforesaid second embodiment, the liquid crystal display can perform the display of 4 lines×18 columns, however, the present invention is not limited to thereto and even the case where a liquid crystal display having the other number of lines or the other number of columns is employed, the same effects as the above can be also obtained. However, in such case too, a liquid crystal display which can perform the display of three lines or more is preferable, in order to offer the user a display which is easy to recognize.

Further in the aforesaid first and second embodiments, the jog dial 6J which has the rotating mechanism for selecting information and the click mechanism for determining selected information has been employed as the inputting means which is employed to move the cursor and to determine the item, however, the present invention is not limited thereto and various inputting means having other structure can be applied, if their operating direction for inputting movement of the cursor and the operating direction for fixing upon the selected item are different.

For instance, a so-called jog-shuttle of which rotating angle is limited within the stated angle can be employed, and a track-ball or a joy-stick which are provided with a click mechanism can be employed, and a slide-switch which is provided with a click mechanism can be employed. Employing these, a portable telephone apparatus of which number of the operation keys is little and which is handy to carry can be also realized, as with the aforesaid case.

Further, while in the aforesaid first embodiment, the display layout is changed for each hierarchy by the display controlling of the CPU 7, however, the present invention is not limited thereto and if such a control means is provided that changes the display layout for each hierarchy when it causes the display means to display the list of the items, the same effects as the above can be obtained.

Furthermore, in the aforesaid second embodiment, the group name is displayed based on the display controlling of the CPU 7 at the time of the display of the functional item list, however, the present invention is not limited thereto and in the case of displaying the list of the plural items, if the plural items are separated into some groups, and if such a ontrol means is provided that it causes the display means to display the name of the group to which the displayed items belong, the same effects as the above can be obtained.

While the above has been described in connection with the preferred embodiments of the invention, it will be obvious to those skilled in the art that various changes and modifications may be made, therefore it is intended, to cover in the appended claims all such changes and modifications as fall within the true spirit and scope of the invention.

What is claimed is:

1. A portable communication terminal comprising:

a display for displaying a desired item selected out of a plurality of selection items which are hierarchically arranged;

a pointer for indicating said desired item out of said plurality of selection items displayed on said display, said pointer includes a rotatable disc-like member which partly sticks out from a main body of the portable communication terminal;

an instruction switch for causing an item of low hierarchy corresponding to an item indicated by said pointer to be displayed on said display; and a data processor for changing a display layout at a time of switching by said pointer and switch to change from a display listing selection items of high hierarchy in a first format to a display listing selection items of low hierarchy in a second format, said first and second formats being recognizably different.

2. The portable communication terminal according to claim 1, wherein said data processor includes means, at the time of switching by said pointer and switch from the display of the selection items of the high hierarchy to the display of the selection items of the low hierarchy, for simultaneously displaying information indicating the high hierarchy which is linked with said low hierarchy.

3. The portable communication terminal according to claim 1, wherein said data processor includes means, at the time of switching by said pointer and switch from the display for the selection items of the high hierarchy to the display for the items of the low hierarchy, for displaying the character display beginning position of items displayed in said low hierarchy so as to be different from the character display beginning position of selection items which are in said high hierarchy.

4. The portable communication terminal according to claim 1, wherein said data processor includes means for scrolling the selection items of the high hierarchy displayed on said display for every page in accordance with operations of said pointer and for scrolling plural items of the low hierarchy displayed on said display line by line.

5. The portable communication terminal according to claim 1, wherein said data processor includes means for causing said display to display a selection item of the high hierarchy on said display together with items of the low hierarchy which are linked with said displayed selection item.

6. The portable communication terminal according to claim 5, wherein said data processor includes means, in the case of displaying a first selection item and a second selection item which are in the high hierarchy at the same time on the display by said pointer, for displaying an indication showing a boundary of said first selection item and said second selection item.

7. The portable communication terminal according to claim 1, wherein said data processor includes means, at the time of switching by said pointer and switch from the display for selection items of the high hierarchy to the display for items of the low hierarchy. for changing a color of the display for items of the low hierarchy relative to a color of the display for selection items of the high hierarchy.

8. The portable communication terminal according to claim 1, wherein said data processor includes means, at the time of switching by said pointer and switch from the display for selection items of the high hierarchy to the display for items of the low hierarchy, for changing a size of a font for displaying items of the low hierarchy relative to a size a font for displaying selection items of the high hierarchy.

9. The portable communication terminal according to claim 1, wherein said data processor includes means, at the time of switching by said pointer and switch from the display for selection items of the high hierarchy to the display for items of the low hierarchy, for changing a shape of a font for displaying items of the low hierarchy relative to a shape of a font for displaying selection items of the high hierarchy.

10. A portable communication terminal comprising:

a display for displaying a desired item selected out of a plurality of selection items which are hierarchically arranged;

a pointer for indicating said desired item out of said plurality of selection items displayed on said display;

an instruction switch for causing an item of low hierarchy corresponding to an item indicated by said pointer to be displayed on said display; and a data processor for changing a display layout at a time of switching by said pointer and switch to change from a display of selection items of high hierarchy to a display of selection items of low hierarchy, wherein said pointer for indicating a desired item out of said plurality of selection items displayed on said display includes a rotatable disc-like member which partly sticks out from a main body of the portable communication terminal.

11. A portable communication terminal comprising:

a display for displaying a desired item selected out of a plurality of selection items which are hierarchically arranged;

a pointer for indicating said desired item out of said plurality of selection items displayed on said display;

an instruction switch for causing an item of low hierarchy corresponding to an item indicated by said pointer to be displayed on said display; and a data processor for changing a display layout at a time of switching by said pointer and switch to change from a display of selection items of high hierarchy to a display of selection items of low hierarchy, wherein said pointer for indicating a desired item out of said plurality of selection items displayed on said display includes a rotatable disc-like member which partly sticks out from a main body of the portable communication terminal, and said instruction switch for is operated by pushing the disc-like member, which partly sticks out from the main body of the portable communication terminal, in a direction of the main body of portable communication terminal.

* * * * *